Jan. 23, 1945.  M. E. THOMPSON  2,367,976
CONTROL OF SPEED AND POWER TRANSMISSION FOR
INTERNAL-COMBUSTION ENGINES
Filed Jan. 7, 1941    2 Sheets-Sheet 1
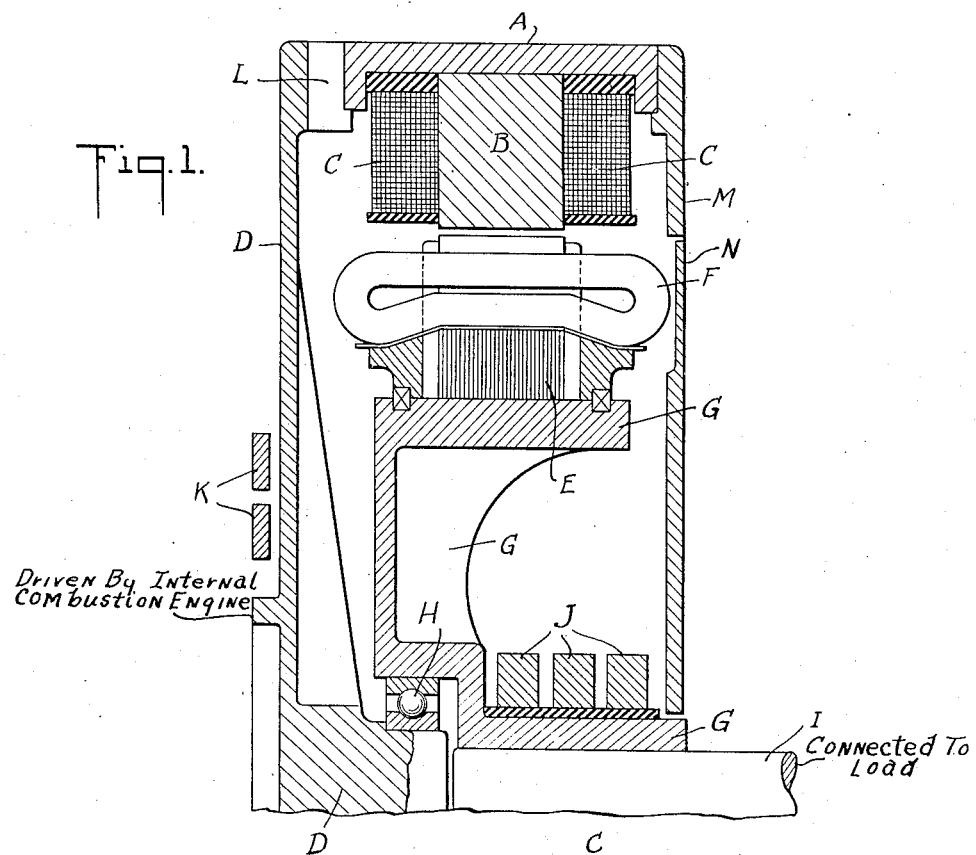
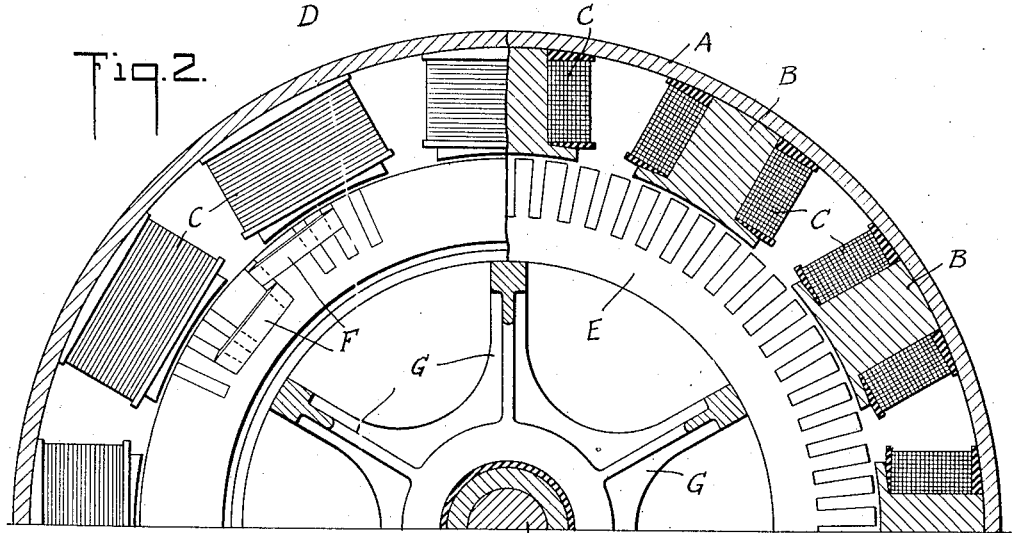
INVENTOR
MILTON E. THOMPSON
ATTORNEYS

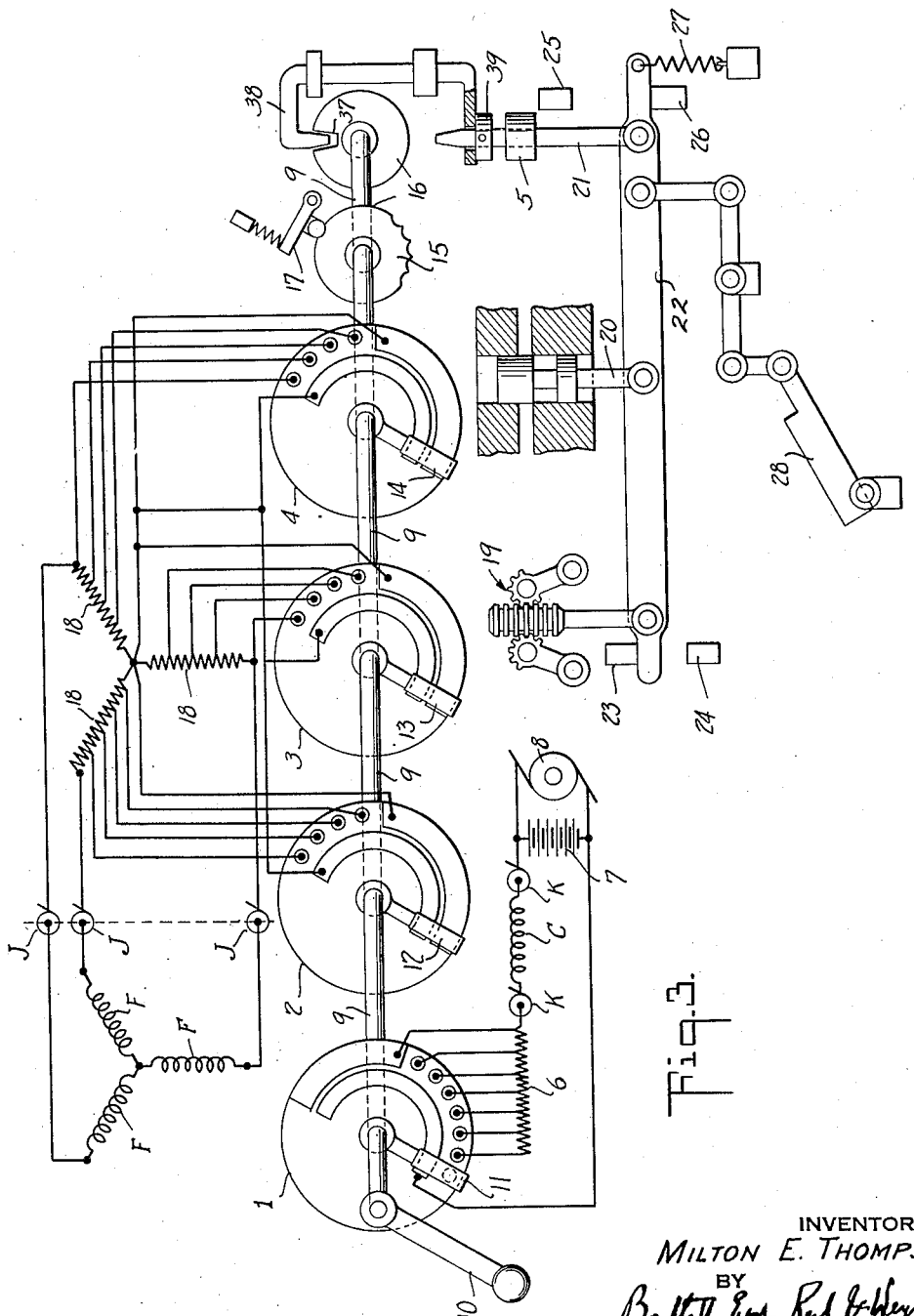

Patented Jan. 23, 1945

2,367,976

UNITED STATES PATENT OFFICE 2,367,976

CONTROL OF SPEED AND POWER TRANSMISSION FOR INTERNAL-COMBUSTION ENGINES

Milton E. Thompson, Ridgway, Pa.; Marian Thompson, executrix of said Milton E. Thompson, deceased, assignor, by mesne assignments, to Marian Thompson Application January 7, 1941, Serial No. 373,472

6 Claims. (Cl. 192—.01)

My invention relates to a control of speed and power transmission for internal combustion engines.

The invention comprises a method of controlling the relative speeds of engine and vehicle and a novel combination of power transmitting and control elements.

The engine is started in the usual manner by an extraneous source of power, as an electric motor. When the vehicle is to be started and accelerated, the engine is first accelerated quickly up to a predetermined fixed speed. The specific speed should be approximately the lowest at which the engine is capable of developing a strong torque. The usual internal combustion engine is capable of developing approximately its maximum torque at about one-quarter of its rated speed, and, therefore, approximately this speed should be selected. With the engine speed maintained at this limit, a slip coupling between engine and vehicle shafts is controlled to make it effective to transmit torque and effect a smooth increase of the speed of the vehicle shaft until the vehicle reaches nearly its maximum speed relatively to that of the engine. When this point is reached the speed limit control is rendered ineffective and the vehicle speed is controlled by controlling the speed of the engine as in the present practice.

While any type of coupling having members which may be controlled to have variable relative speeds may be employed, I prefer to employ electro-magnetic couplings, such as those of the friction type or of the air-gap inductive type. I herein illustrate and describe such an inductive type of coupling. The circuits of this coupling are connected through slip rings with resistances and a controlling device therefor, so that the coupling may be controlled for any degree of slippage as between the driving and driven members until there is maximum power transmission, at which time the driven member rotates at almost the speed of the driving member. I have illustrated a coupling in which the driving member is a field structure with salient poles excited by direct current winding, and the driven member has a series of windings whose circuits are closed through the slip rings and the external circuits including the controlling device. The speed of the engine may be controlled in the usual way by a throttle valve, but during the initial starting and accelerating period and until the speeds of the driving and driven coupling members have become approximately equal, a speed governor is effective to control the throttle opening to maintain the engine at the predetermined fixed speed limit. The coupling controller first connects the exciting coils of the driving member to the battery or other source of power, then gradually removes resistance from this field circuit, and then gradually cuts out resistance in the circuits of the windings of the driven member. I employ means to prevent the coupling controller from being moved to energize the circuits of the coupling except when the throttle valve has been opened sufficiently to develop substantial engine speed, and I also prefer to provide means for preventing the controller from being moved away from its "on" position while the vehicle is being maintained at normal speeds.

In the practice of my invention for use on vehicles I prefer to maintain the usual gear shift for varying the relative speeds of engine and vehicle, but usually there will be no need for shifting gears in starting and accelerating the car. Ordinarily the shift lever may be maintained at high speed position and shifted only when it is necessary for unusual conditions, such as starting on a steep grade or backing up the car or climbing grades too steep for ascension with the engine in high gear.

Referring to the drawings, Fig. 1 is a vertical longitudinal section of one-half of a coupling suitalbe for use as the coupling element of my invention. Fig. 2 shows the same half of the coupling on a relatively reduced scale and partly in vertical transverse section. Fig. 3 is a diagrammatic disclosure of my control of the coupling and of the engine.

Referring to Figs. 1 and 2, A is a cylindrical steel yoke having salient poles B surrounded by field coils C. The field structure is supported by the disk D secured to the yoke A in any suitable manner as by bolts (not shown). E is a cylindrical slotted core of the internal driven member. In its slots are the coils F of a three-phase closed circuit winding. This driven member is mounted on a spider G fastened to the driven shaft I. H is a ball-bearing between the spider G and the shaft carried by the disk D for maintaining the driving and driven shafts concentric and the air gap between the two members uniform. J, J are slip rings mounted on the hub of the spider G and insulated therefrom. There are connections (not shown) from the three terminals of the windings F to these slip rings. K, K are slip rings mounted on the driving disk D of the driving member and connected to the terminals of the field exciting coils. To obtain a cooling air circulation, radial fan blades L are machined from the ring periphery of disk D and suitable openings for the passage of air may be provided in the plate M secured to the yoke A and in the stationary plate N.

I will now refer to the control devices shown on Fig. 3 of the drawings. The three-phase windings F of the driven member and the field exciting winding C of the driving member are illustrated diagrammatically, as also are the slip rings J and K. 18 indicates resistances for the circuits of the winding F, and 6 represents a resistance for the circuit of the field winding C.

The coupling controlling device as diagrammed may be a typical form of drum controller whose lever 10 is manually operated to turn a shaft 9, through whose movement switch arms 11, 12, 13 and 14 are moved synchronously, as well as disks 15 and 16. The switch arm 11 controls the circuit of the field coils from the car battery 7 and generator 8 through the slip rings and the variable resistance 6. The switch arms 12, 13 and 14 control the connections of the windings F of the driven member of the coupling to the resistances 18. The disk 15 is a usual notched controller disk to enable the operator to feel the "off" and "on" and certain other positions of the controller when the spring pressed roller on lever 17 engages a notch. The disk 16 performs certain stop and locking functions hereinafter described.

I provide the usual engine throttle control 20. This, as illustrated, is controlled by a floating lever 22 which is moved upward at its righthand end through linkage operated from the treadle 28 against the tension of spring 27. This is the usual accelerator treadle which the operator controls by pressure of his right foot. The other end of the floating lever is pushed downward by the speed governor, illustrated diagrammatically at 19, when the speed of the engine reaches a predetermined speed limit, say, about one-fourth of maximum speed. 23, 24, 25 and 26 are stops limiting the movements of the opposite ends of the floating lever 22. 21 is a bar secured to the righthand end of the floating lever and guided in stationary block 5. This bar 21 cooperates with various other elements to perform two functions. First, it cooperates with the disk 16 to determine when the speed governor shall be effective to limit the speed of the engine and when it shall not be effective. When the controller is in the position shown and the engine throttle is opened by pushing down on the treadle 28, the speed governor may gradually lower the lefthand end of the floating lever, and the operator will be prevented from overcoming this by the engagement of the upper end of the bar 21 with the disk 16, but when, as hereinafter described, the controller has been moved to full "on" position, then the slot 37 in the disk 16 will be moved 180° and the top of bar 21 can enter that slot and give full control of the engine speed to the operator, notwithstanding that the speed regulator may have moved the lefthand end of the floating lever down against the stop 24. Second, when the coupler controller is in the "off" position, as indicated in the drawings, it is locked by a link 38 entering the notch 37 and supported by a ring 39 attached to the bar 21 and, therefore, the operator cannot move the controller until by pressing the treadle 28 he opens the throttle valve, and simultaneously lifts the hooked end of the lock 38 from the notch 37. Also when the coupling controller is at the "off" position it cannot be moved away from that position while the vehicle is being maintained at normal running speeds until the operator takes his foot from the accelerator pedal because the upper end of the bar 21 is under these conditions in the recess 37.

For starting and operating a car under usual conditions, the operation is as follows: If the shift gear is at neutral, it may be moved to high speed position before starting the car or at any time before operating the coupling controller. The car is first started by the usual self-starter (not shown) which I prefer to actuate by a pedal at the left hand of the driver. The operator then presses the treadle 28 as far as it will go, its limit of motion being determined by the engagement of the bar 21 with the disk 16, and maintains the treadle in this position during the entire starting period. The engine, being under no load, begins to speed up quickly, but the speed governor prevents the speed from rising beyond the limit set. Then the operator moves the coupling controller lever 10, which can be conveniently placed for righthand operation, through about one-half its operating range, during which time the field circuit coils C will be energized, first, through the resistances 6 and, finally, with full excitation. Usually this movement of the controller can be made with considerable rapidity. At this time the disk 15 will have reached a point where the spring-pressed roller 17 will have dropped into the first of the series of notches as shown on that disk. The operator, finding that the car is starting in a normal manner, now accelerates the car by moving the controller lever from notch to notch to obtain a smooth acceleration. At the first notch position all the resistances 18 are in series with the windings F, and but a small portion of the power of the engine can be transmitted through the coupling to the vehicle, but as the operator moves from notch to notch these resistances are cut out and the speed of the driven member keeps increasing. When the resistances 18 are all cut out of the circuits the driven member of the clutch will almost reach the speed of the driving member. At this time the notch 37 will be just above the end of the bar 21, so that further speed acceleration is completely within the control of the operator.

In stopping the car the operator may take his right foot from the treadle 28 and apply the brake in the usual manner. By taking his foot off the treadle and thus lowering the bar 21 the coupling controller is unlocked, and whenever the speed of the vehicle becomes reduced to a point where the operator should disconnect vehicle and engine he moves the coupling controller lever to its "off" position. It is not necessary for him to make any shift in the gearing.

In starting on steep grades or other conditions placing a heavy load on the vehicle, the gear shift can be placed either in low speed or in second, all the other operations being identical.

When it is desired to maneuver a car, as for parking etc., it would be usually desirable to place the gear in low speed position, shifting to reverse when necessary, and control the starting and movement of the car mainly or entirely by the shifting of the coupling control lever forward and backward between the different notched positions of the controller. This control for such maneuvering can be effected with more accuracy and ease and with far less danger of trouble than when the friction clutch must be manipulated, for the engine will be maintained at a substantially uniform limited speed, and the variations of vehicle speed brought about by varying the degree of slip in the coupling will not injure the coupling.

I have designated the direct current field member as the driving and the three-phase armature member as the driven member, but this is only a matter of preference, as such a magnetic coupling is reversible. For this reason, if the vehicle should accelerate on a steep downgrade, the acceleration of the driven member would be retarded by the magnetic reaction between the two members. This braking effect of the coupling assists that due to the compression of the engine. Moreover, the fly-wheel action of the driving member makes it unnecessary to provide the engine with a separate fly-wheel.

By the use of my invention the operation in starting and accelerating the vehicle and maneuvering it at low speeds is improved and the operator may effect this control with a simpler manipulation than heretofore and without the skill at present required. Since full engine torque is developed before any power is transmitted to the vehicle, the shifting of gears is not ordinarily required during starting and acceleration or maneuvering, and the speed of the vehicle is smoothly accelerated by the simple control of the slip between the two members of the coupling. The speed of the engine for this purpose being a fixed one under control of the speed regulator, the operator needs only to push his accelerator pedal as far as it will go and maintain it at this position all during the period of controlling the slip of the coupling, thus relieving him of the necessity he is now under of deliberately controlling the accelerator pedal to vary the speed of the car for smooth accleration.

I have described and illustrated my invention in connection with its use on a vehicle, but the principle of my invention is not limited to such specific use. Moreover, essential principles of my invention as set forth in the appended claims may be practiced with wide variations in specific details of structure herein illustrated and described, with or without the addition of automatic or semi-automatic controls.

Having thus described my invention, I claim:

1. Speed and power transmission apparatus for an internal combustion engine comprising a clip coupling between the engine and the load, a coupling controller, an operator-controlled accelerator for the engine, an engine-operated speed regulator, and means cooperatively related to the accelerator and the coupling controller to render the speed regulator effective to limit the speed of the engine except when the coupling controller it at its full power position and ineffective when at such position, and to compel sequential operation first of the accelerator and then of the coupling controller.

2. In a speed and power transmission apparatus for an internal combustion engine having an operator-controlled accelerator for the engine, the combination of a slip coupling between the engine and the load, a coupling controller, an engine-controlled speed regulator and means cooperatively related to the accelerator and engine speed regulator for rendering said speed regulator effective to maintain the engine at a constant predetermined speed when the coupling controller is not at full "on" position and to render it ineffective when the coupling controller is at such "on" position.

3. In a speed and power transmission apparatus for an internal combustion engine, a slip coupling between the engine and the load, a coupling control, an operator-controlled accelerator for the engine, an engine-operated speed regulator, and operator controlled means cooperatively related to the accelerator, the engine speed regulator and the coupling controller for causing the speed regulator either to maintain a constant speed or to be rendered ineffective.

4. In a speed and power transmission apparatus for an internal combustion engine, a slip coupling between the engine and the load, a coupling control, an operator-controlled accelerator for the engine, an engine-operated speed regulator, means cooperatively related to the accelerator and the coupling controller for determining when the speed regulator shall be effective and when it shall be ineffective to limit the engine speed, and means to compel sequential operation first of the accelerator and then the coupling controller.

5. In a control and power transmission system for an internal combustion engine, a slip coupling between the engine and the load, a controller therefor, an operator-controlled accelerator, an engine-operated speed regulator set to maintain the engine at a predetermined constant speed at which it will develop approximately maximum torque, means for rendering the speed regulator effective to maintain the engine constantly at said speed, and operator-controlled means to render the speed regulator wholly ineffective, whereby the engine may be maintained at a constant high torque speed all during the period during which the coupling slip is being decreased to gradually accelerate the load, while at other times the operator may have complete control of the speed.

6. In a control and power transmission system for an internal combustion engine, a slip coupling between the engine and the load, a controller therefor, an operator-controlled accelerator, an engine-operated speed regulator set for approximately maximum torque speed of the engine, a throttle control member connected to be acted upon oppositely by the accelerator and the speed regulator, stops limiting the opposite movements of said member, and operator-controlled means for moving one of such stops enabling the operator to maintain constant maximum torque speed during the coupling operation and to vary his speed without control from the speed regulator thereafter.

MILTON E. THOMPSON.